US 6,634,223 B2

(12) United States Patent
Hartmann et al.

(10) Patent No.: US 6,634,223 B2
(45) Date of Patent: Oct. 21, 2003

(54) METHOD FOR MEASURING THE TREAD DEPTH OF A TIRE

(75) Inventors: Klaus Hartmann, Neustadt (DE); Frank Gauterin, Neustadt (DE); Heiko Grunberg, Burgdorf (DE)

(73) Assignee: Continental Aktiengesellschaft (DE)

( * ) Notice: Subject to any disclaimer, the term of this patent is extended or adjusted under 35 U.S.C. 154(b) by 0 days.

(21) Appl. No.: 10/053,491

(22) Filed: Jan. 18, 2002

(65) Prior Publication Data

US 2002/0108435 A1 Aug. 15, 2002

(30) Foreign Application Priority Data

Jan. 19, 2001 (DE) .......................... 101 02 534

(51) Int. Cl.$^7$ .............................. G01M 17/02
(52) U.S. Cl. ....................................... 73/146
(58) Field of Search ................ 73/146–146.8; 340/438; 152/209, 209.8, 209.12, 15, 16; 702/166; 364/506, 550

(56) References Cited

U.S. PATENT DOCUMENTS 4,171,676 A 10/1979 Kennel

FOREIGN PATENT DOCUMENTS

| DE | 596 861 | 5/1934 |
| DE | 2314915 | 10/1974 |
| DE | 28 52 389 | 6/1980 |
| DE | 3709981 | 10/1988 |
| DE | 42 13 221 | 10/1993 |
| FR | 2 291 880 | 6/1976 |
| FR | 2671632 | 7/1992 |

OTHER PUBLICATIONS

Article—Tire–road interaction noise.
JP 57 161621, Patent Abstracts of Japan.

Primary Examiner—Hezron Williams
Assistant Examiner—Marissa Ferguson
(74) Attorney, Agent, or Firm—R W Becker & Associates; R W Becker

(57) ABSTRACT

A method is provided for measuring the tread or profile depth of a tire in the operating state while the tire is rolling and in contact with a surface below it. Vibrations of the tire or tire parts, which vibrations are generated by the spacing and/or geometry of profiled elements of the tire tread, are detected while the tire is rolling and in contact with the surface below it. The detected vibrations are compared in an evaluation unit with a characteristic theoretical value/threshold value that corresponds to a vibration generated by a tread of adequate depth. The evaluation unit issues a signal if the detected vibration deviates from the theoretical value/threshold value.

11 Claims, 1 Drawing Sheet

US 6,634,223 B2

METHOD FOR MEASURING THE TREAD DEPTH OF A TIRE

BACKGROUND OF THE INVENTION

The present invention relates to a method for measuring the tread of a tire, especially a pneumatic vehicle tire, whereby the measurement of the tread depth is effected in the operating state while the tire is rolling and in contact with a surface below it. The present invention also relates to a tire for carrying out such a method as well as the use thereof.

Methods for detecting the tread depth of a tire in the operating state, i.e. while the tire is rolling and in contact with the ground, in other words while the vehicle is moving, are known in principle and serve for generating a warning for the driver or monitoring personnel as early as possible before a lower limit that is critical for the tread depth is reached.

DE PS 596 861 discloses, for example, an indicator apparatus for the maximum permissible wear of rubber tires, according to which spring elements are disposed in the tread of the tire that after a certain thickness of the rubber layer has been worn away spring outwardly and trigger alarm signals electrically as the tire rotates. The drawback of such spring elements include an increased weight of the tire and a more difficult manufacturing process for such tires.

DE OS 2 314 915 discloses a vehicle tire in which one or more differently colored or structured layers are embedded in the tread or profiled surfaces, with such layers differing from the remaining wear surfaces that are provided and becoming visible after a certain amount of wear of the tread. However, the visibility of such layers is very adversely affected during operation due to dirt or deposits.

It is therefore an object of the present invention to provide a method for the detection of the tread or profile depth of a tire in the operating state, with such method being easy to use, and not only with heavier tires or with a more complicated manufacturing process, and which is capable of functioning in all operating states and even in dirty environments.

SUMMARY OF THE INVENTION

The method of the present invention is characterized primarily in that the vibrations of the tire or of parts thereof, which vibrations are generated by the spacing and/or geometry of the profiled elements of the tire tread while the tire is rolling and in contact with the surface below it, are detected and are compared, in an evaluation unit, with a characteristic theoretical value/threshold value for the vibrations, which characteristic value corresponds to a vibration generated by a tread of adequate depth, whereby the evaluation unit issues a signal if a detected vibration deviates from the theoretical value/threshold value, which deviation corresponds to a tread depth that is less than the adequate depth.

In this way, it is possible at any time to check the tread depth by means of an actual vibration evaluation that can be carried out relatively economically and without complicated devices with the aid of today's electronics and the processing of even complex algorithms that are possible therewith; this checking of the tread depth can in particular be realized in that the output signal, namely the vibrations, in other words for example the operating noises of a tire, produced by the spacing and/or geometry of the profiled elements of the tire tread, is permanently present and does not first have to be generated.

Pursuant to one advantageous specific embodiment of the present invention, it is the body vibrations/structure-borne noise vibrations of the tire or of the chassis or body parts, and which are generated by the spacing and/or geometry of the profiled elements of the tire tread, that are detected. To receive the vibrations, a simple vibration sensor on the body or chassis components suffices, which can be mounted, for example, in the vicinity of the tire.

Pursuant to a further advantageous embodiment of the present invention, it is the noises/air-borne noise vibrations of the tire or of the chassis or body parts, which are generated by the spacing and/or geometry of the profiled elements of the tire tread, that are detected. To receive the vibrations, a simple microphone suffices, which can be mounted, for example, in the vicinity of the tire.

With a tire that is particularly suitable for carrying out such a method, as the tread depth decreases the spacing and/or geometry of the profiled elements of the tire tread vary such that while the tire is rolling and in contact with a surface below it, a vibration is generated that is characteristic for the decreased tread depth and that is clearly distinguishable from a characteristic vibration generated by the full tread depth. This simplifies the defined detection and hence the specific determination of the critical tread depth.

Pursuant to one advantageous specific embodiment of such a tire, the geometry of the profiled elements of the tire tread is such that the positive portion of the profiled elements increases or decreases as a function of the tread depth. In this way there is obtained a vibration frequency that is altered at a reduced tread depth.

Pursuant to a further advantageous specific embodiment of such a tire, the spacing of the profiled elements of the tire tread is such that there results a pitch sequence that is a function of the tread depth. Here also there consequently results a vibration frequency that is altered at a reduced tread depth. This effect is reinforced even further in that the spacing of the profiled elements of the tire tread varies in an essentially sudden manner as the tread depth decreases essentially due to the fact that tread depths of lesser height are provided that come into contact with the surface of the roadway only after a wear of the adjacent tire tread depths, and then make contact relatively suddenly.

BRIEF DESCRIPTION OF THE DRAWINGS

The object and advantages of the present invention will appear more clearly in conjunction with the accompanying schematic drawings, in which:

FIG. 1 shows a tire 1 operable to roll in contact with a surface below it. In accordance with the present invention, a method for measuring the tread or profile depth of the tire 1 is effected by the arrangement shown in FIG. 1. The arrangement in FIG. 1 is operable to effect the measurement of the tread depth of the tire 1 in an operating state while the tire 1 is rolling and in contact with a surface below it. The arrangement includes a sensor 2 for detecting oscillations of the tire 1 when the tire is rolling in contact with a surface below it and an evaluation unit 3 for evaluating vibrations of the tire 1 detected by the sensor 2 and comparing these detected vibrations with a characteristic theoretical value/threshold value for the vibrations provided to the evaluation unit 2 by a threshold value generator 4. The arrangement also includes a display device 6 for providing a displayed signal indicating decreased tread depth of the tire 1.

FIG. 2 shows, in enlarged sectional view, a portion of one modification of the tire 1 shown in FIG. 1 in which the geometry of the profiled elements 6 of the tire tread of the tire 1 is such that a positive portion of the profiled elements increases or decreases as a function of the tread depth 7 of the tire 1.

FIG. 3 shows, in an enlarged sectional view, a portion of another modification of the tire 1 shown in FIG. 1 in which the spacing of the profiled elements 6 of the tire tread of the tire 1 varies in an essentially sudden manner as the tread depth decreases.

Figure 1:
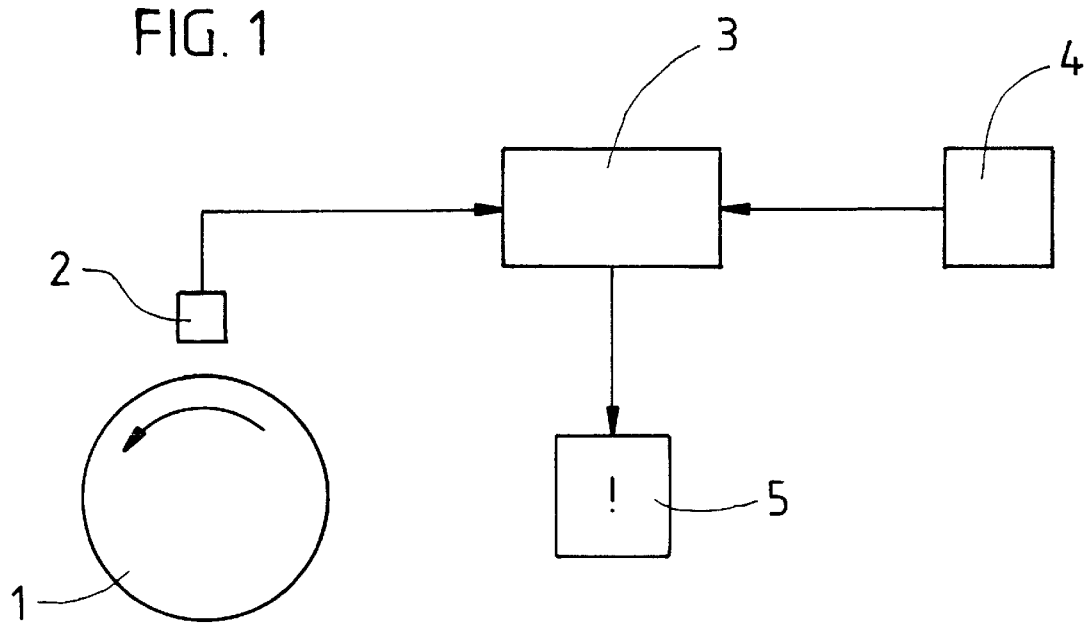
FIG. 1 is a schematic view of an arrangement for measuring a tire in accordance with the present invention.
Figure 2:
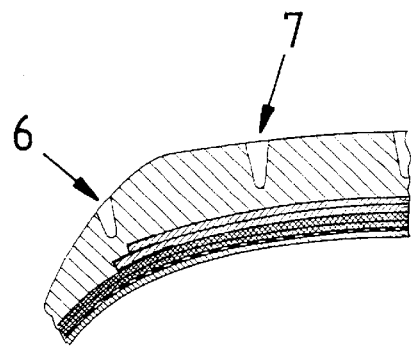
FIG. 2 is an enlarged sectional view of a portion of one modification of the tire shown in FIG. 1 in which the geometry of the profiled elements of the tire tread is such that a positive portion of the profiled elements increases or decreases as a function of the tread depth.
Figure 3:
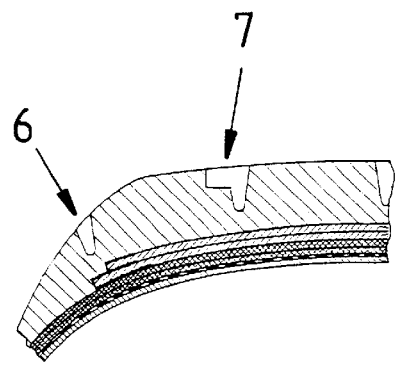
FIG. 3 is an enlarged sectional view of a portion of another modification of the tire shown in FIG. 1 in which the spacing of the profiled elements of the tire tread varies in an essentially sudden manner as the tread depth decreases.

To carry out the method of the present invention, in a particularly advantageous manner a tire can be used wherein, as the tread depth decreases, the spacing and/or geometry of the profiled elements of the tire tread vary such that while the tire is rolling and in contact with the surface below it, a vibration is generated that is characteristic for the decreased tread depth and that is clearly distinguishable from a characteristic vibration generated by the full tread depth.

The specification incorporates by reference the disclosure of German priority document 101 02 534.3 of Jan. 19, 2001.

The present invention is, of course, in no way restricted to the specific disclosure of the specification, but also encompasses any modifications within the scope of the appended claims.

We claim:

1. A method for measuring the tread or profile depth of a tire, whereby measurement of the tread depth takes place in an operating state while the tire is rolling and in contact with a surface below it, said method including the steps of:

detecting vibrations of said tire or of parts thereof, wherein vibrations are generated by at least one of a spacing and geometry of profiled elements of said tire tread while the tire is rolling and in contact with a surface below it; and comparing the detected vibrations, in an evaluation unit, with a characteristic theoretical value/threshold value for the vibrations, which characteristic value corresponds to a vibration generated by a tread of adequate depth, wherein said evaluation unit issues a signal if a detected vibration deviates from said theoretical value/threshold value, which deviation corresponds to a tread depth that is less than said adequate depth.

2. A method according to claim 1, wherein said vibrations detected are body vibrations/structure-borne noise vibrations of the tire or of chassis or body parts, which are generated by at least one of said spacing and geometry of said profiled elements of said tire tread.

3. A method according to claim 1, wherein the vibrations detected are noises/air-borne noise vibrations of said tire or of the chassis or body parts, which are generated by at least one of said spacing and geometry of said profiled elements of said tire tread.

4. A tire for carrying out the method of claim 1, wherein, as said tread depth decreases, at least one of said spacing and geometry of said profiled elements of said tire tread varies such that while the tire is rolling and in contact with a surface below it, a vibration is generated that is characteristic for said decreased tread depth and that is clearly distinguishable from a characteristic vibration generated by a full tread depth.

5. A tire according to claim 4, wherein said geometry of said profiled elements of said tire tread is such that a positive portion of said profiled elements increases or decreases as a function of said tread depth.

6. A tire according to claim 4, wherein said spacing of said profiled elements of said tire tread is such that a pitch sequence results as a function of said tread depth.

7. A tire according to claim 6, wherein said spacing of said profiled elements of said tire tread varies in an essentially sudden manner as said tread depth decreases.

8. A tire comprising:

a non-tread portion; and a tread, said tread decreasing from a full tread depth to a decreased tread depth as the tire rolls in contact with a surface below it and said tread having profiled elements with at least one of a spacing and geometry of said profiled elements of said tire tread varying such that, while the tire is rolling and in contact with a surface below it, a decreased tread depth vibration is generated that is characteristic for said tread depth and that is clearly distinguishable from a full tread depth characteristic vibration generated when said tread is at a full tread depth.

9. A tire according to claim 8, wherein said geometry of said profiled elements of said tire tread is such that a positive portion of said profiled elements increases or decreases as a function of sage tread depth.

10. A tire according to claim 8, wherein said spacing of said profiled elements of said tire tread is such that a pitch sequence results as a function of said tread depth.

11. A tire according to claim 10, wherein said spacing of said profiled elements of said tire tread varies in an essentially sudden manner as said tread depth decreases.

* * * * *